United States Patent
Niklaus et al.

(10) Patent No.: US 12,283,060 B2
(45) Date of Patent: Apr. 22, 2025

(54) SPLATTING-BASED DIGITAL IMAGE SYNTHESIS

(71) Applicant: Adobe Inc., San Jose, CA (US)

(72) Inventors: Simon Niklaus, San Jose, CA (US); Jiawen Chen, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 466 days.

(21) Appl. No.: 17/714,373

(22) Filed: Apr. 6, 2022

(65) Prior Publication Data
US 2023/0326044 A1 Oct. 12, 2023

(51) Int. Cl.
| | |
|---|---|
| G06T 7/269 | (2017.01) |
| G06T 3/18 | (2024.01) |
| G06T 3/40 | (2024.01) |
| G06T 11/00 | (2006.01) |

(52) U.S. Cl.
CPC ............ *G06T 7/269* (2017.01); *G06T 3/40* (2013.01); *G06T 11/00* (2013.01); *G06T 2207/20084* (2013.01); *G06T 2207/20221* (2013.01)

(58) Field of Classification Search
CPC ........... G06T 11/00; G06T 2207/20084; G06T 2207/20221; G06T 3/18; G06T 3/40; G06T 7/269
See application file for complete search history.

(56) References Cited

U.S. PATENT DOCUMENTS

| | | | |
|---|---|---|---|
| 9,442,471 B2 * | 9/2016 | Frigo | B21D 5/004 |
| 12,169,909 B2 | 12/2024 | Niklaus et al. | |
| 2017/0140532 A1 * | 5/2017 | Dascal | G06T 7/0012 |
| 2022/0303495 A1 * | 9/2022 | Choe | G06T 5/50 |
| 2023/0325968 A1 | 10/2023 | Niklaus et al. | |
| 2024/0257321 A1 * | 8/2024 | Chou | G06N 20/00 |

FOREIGN PATENT DOCUMENTS

| | | | |
|---|---|---|---|
| CN | 112109374 A | * 12/2020 | |
| WO | WO-2021241804 A1 | * 12/2021 | G06N 3/08 |

OTHER PUBLICATIONS

Simon Niklaus, "Many-to-many Splatting for Efficient Video Frame Interpolation"; IEEE Conference on Computer Vision and Pattern Recognition, pp. 3543-3550 (Year: 2022).*

(Continued)

*Primary Examiner* — Asghar H Bilgrami
(74) *Attorney, Agent, or Firm* — FIG. 1 Patents

(57) ABSTRACT

Digital image synthesis techniques are described that leverage splatting, i.e., forward warping. In one example, a first digital image and a first optical flow are received by a digital image synthesis system. A first splat metric and a first merge metric are constructed by the digital image synthesis system that defines a weighted map of respective pixels. From this, the digital image synthesis system produces a first warped optical flow and a first warp merge metric corresponding to an interpolation instant by forward warping the first optical flow based on the splat metric and the merge metric. A first warped digital image corresponding to the interpolation instant is formed by the digital image synthesis system by backward warping the first digital image based on the first warped optical flow.

20 Claims, 11 Drawing Sheets

(56) References Cited

OTHER PUBLICATIONS

Simon Niklaus, "Softmax Splatting for Video Frame Interpolation"; IEEE Conference on Computer Vision and Pattern Recognition, pp. 5436-5443 (Year: 2020).*
U.S. Appl. No. 17/714,356, "Non-Final Office Action", U.S. Appl. No. 17/714,356, filed May 22, 2024, 12 pages.
U.S. Appl. No. 17/714,356, "Notice of Allowance", U.S. Appl. No. 17/714,356, filed Aug. 7, 2024, 8 pages.
"Xiph.org Video Test Media (derf's collection)", Xiph.Org [retrieved Feb. 17, 2022]. Retrieved from the Internet <https://media.xiph.org/video/derf/>., 18 Pages.
Baker, Simon et al., "A Database and Evaluation Methodology for Optical Flow", 11th IEEE International Conference on Computer Vision [retrieved Feb. 15, 2022]. Retrieved from the Internet <https://vision.middlebury.edu/flow/floweval-ijcv2011.pdf>., Nov. 2010, 31 Pages.
Bao, Wenbo et al., "Depth-Aware Video Frame Interpolation", Cornell University arXiv, arXiv.org [retrieved Feb. 15, 2022]. Retrieved from the Internet <https://arxiv.org/pdf/1904.00830.pdf>., Apr. 1, 2019, 10 Pages.
Bao, Wenbo et al., "MEMC-Net: Motion Estimation and Motion Compensation Driven Neural Network for Video Interpolation and Enhancement", IEEE Transactions on Pattern Analysis and Machine Intelligence vol. 43, No. 3 [retrieved Feb. 15, 2022]. Retrieved from the Internet <https://openreview.net/pdf?id=B1ljyz1B3r>., Sep. 2019, 16 Pages.
Bengio, Yoshua et al., "Deep Learning", The MIT Press, Cambridge, Massachusetts [retrieved Feb. 21, 2022]. Retrieved from the Internet <https://doi.org/10.1007/s10710-017-9314-z>., Oct. 3, 2015, 706 Pages.
Brooks, Tim et al., "Learning to Synthesize Motion Blur", Cornell University arXiv, arXiv.org [retrieved Feb. 21, 2022]. Retrieved from the Internet <https://arxiv.org/pdf/1811.11745.pdf>., Jun. 20, 2019, 14 Pages.
Charbonnier, P et al., "Two deterministic half-quadratic regularization algorithms for computed imaging", Proceedings of 1st International Conference on Image Processing vol. 2 [retrieved Feb. 15, 2022]. Retrieved from the Internet <https://citeseerx.ist.psu.edu/viewdoc/download?doi=10.1.1.469.129&rep=rep1&type=pdf>., 1994, 5 Pages.
Chen, Wanli et al., "Tensor Low-Rank Reconstruction for Semantic Segmentation", Cornell University arXiv, arXiv.org [retrieved Feb. 15, 2022]. Retrieved from the Internet <https://arxiv.org/pdf/2008.00490.pdf>., Aug. 2, 2020, 19 Pages.
Cheng, Xianhang et al., "Multiple Video Frame Interpolation via Enhanced Deformable Separable Convolution", Cornell University arXiv, arXiv.org [retrieved Feb. 21, 2022]. Retrieved from the Internet <https://arxiv.org/pdf/2006.08070.pdf>., Jan. 25, 2021, 18 Pages.
Cheng, Xianhang et al., "Video Frame Interpolation via Deformable Separable Convolution", Proceedings of the AAAI Conference on Artificial Intelligence vol. 34 No. 07 [retrieved Feb. 15, 2022]. Retrieved from the Internet <https://ojs.aaai.org/index.php/AAAI/article/view/6634>., Apr. 3, 2020, 8 Pages.
Chi, Zhixiang et al., "All at Once: Temporally Adaptive Multi-frame Interpolation with Advanced Motion Modeling", Cornell University arXiv, arXiv.org [retrieved Feb. 21, 2022]. Retrieved from the Internet <https://arxiv.org/pdf/2007.11762.pdf>., Jan. 9, 2021, 16 Pages.
Choi, Byeong Doo et al., "Motion-Compensated Frame Interpolation Using Bilateral Motion Estimation and Adaptive Overlapped Block Motion Compensation", IEEE Transactions on Circuits and Systems for Video Technology, vol. 17, No. 4 [retrieved May 17, 2022]. Retrieved from the Internet <https://doi.org/10.1109/TCSVT.2007.893835>., Apr. 1, 2007, 10 pages.
Choi, Byung-Tae et al., "New Frame Rate Up-Conversion Using Bi-Directional Motion Estimation", IEEE Transactions on Consumer Electronics vol. 46, No. 3 [retrieved May 17, 2022]. Retrieved from the Internet <https://doi.org/10.1109/30.883418>., Aug. 2000, 7 pages.
Choi, Myungsub et al., "Channel Attention Is All You Need for Video Frame Interpolation", Proceedings of the AAAI Conference on Artificial Intelligence vol. 34, No. 7 [retrieved Feb. 15, 2022]. Retrieved from the Internet <https://ojs.aaai.org/index.php/AAAI/article/view/6693>., Apr. 3, 2020, 9 Pages.
Choi, Myungsub et al., "Motion-Aware Dynamic Architecture for Efficient Frame Interpolation", Proceedings of the IEEE/CVF International Conference on Computer Vision (ICCV) [retrieved Feb. 15, 2022] .<https://openaccess.thecvf.com/content/ICCV2021/papers/Choi_Motion-Aware_Dynamic_Architecture_for_Efficient_Frame_Interpolation_ICCV_2021_paper.pdf>., Oct. 2021, 10 Pages.
Choi, Myungsub et al., "Scene-Adaptive Video Frame Interpolation via Meta-Learning", Cornell University arXiv, arXiv.org [retrieved Feb. 21, 2022]. Retrieved from the Internet <https://arxiv.org/pdf/2004.00779.pdf>., Apr. 2, 2020, 10 Pages.
Dikbas, Salih et al., "Novel True-Motion Estimation Algorithm and Its Application to Motion-Compensated Temporal Frame Interpolation", IEEE Transactions on Image Processing vol. 22, No. 8 [retrieved May 17, 2022]. Retrieved from the Internet <https://doi.org/10.1109/TIP.2012.2222893>., Oct. 4, 2012, 15 pages.
Ding, Tianyu et al., "CDFI: Compression-Driven Network Design for Frame Interpolation", Cornell University arXiv, arXiv.org [retrieved Feb. 21, 2022]. Retrieved from the Internet <https://arxiv.org/pdf/2103.10559.pdf>., Mar. 28, 2021, 11 Pages.
Dong, Weisheng et al., "Nonlocal Sparse and Low-Rank Regularization for Optical Flow Estimation", IEEE Transactions on Image Processing, vol. 23, No. 10 [retrieved Feb. 15, 2022]. Retrieved from the Internet <https://people.eecs.berkeley.edu/~yima/psfile/Flow_TIP_Double_Column.pdf>., 2014, 12 Pages.
Dosovitskiy, Alexey et al., "FlowNet: Learning Optical Flow With Convolutional Networks", IEEE International Conference on Computer Vision [retrieved Mar. 21, 2022]. Retrieved from the Internet <http://citeseerx.ist.psu.edu/viewdoc/download?doi=10.1.1.708.2328&rep=rep1&type=pdf>., Dec. 2015, 9 Pages.
Eldesokey, Abdelrahman et al., "Normalized Convolution Upsampling for Refined Optical Flow Estimation", Cornell University arXiv, arXiv.org [retrieved Feb. 21, 2022]. Retrieved from the Internet <https://arxiv.org/pdf/2102.06979.pdf>., Feb. 13, 2021, 11 Pages.
Fan, Bin et al., "Inverting a Rolling Shutter Camera: Bring Rolling Shutter Images to High Framerate Global Shutter Video", IEEE/CVF International Conference on Computer Vision [retrieved Feb. 21, 2022]. Retrieved from the Internet <https://openaccess.thecvf.com/content/ICCV2021/papers/Fan_Inverting_a_Rolling_Shutter_Camera_Bring_Rolling_Shutter_Images_to_ICCV_2021_paper.pdf>., 2021, 10 Pages.
Feng, Runsen et al., "Versatile Learned Video Compression", Cornell University arXiv, arXiv.org [retrieved Feb. 21, 2022]. Retrieved from the Internet <https://arxiv.org/pdf/2111.03386.pdf>., Jan. 5, 2022, 14 Pages.
Gui, Shurui et al., "FeatureFlow: Robust Video Interpolation via Structure-to-Texture Generation", IEEE/CVF [retrieved Feb. 21, 2022]. Retrieved from the Internet <https://openaccess.thecvf.com/content_CVPR_2020/papers/Gui_FeatureFlow_Robust_Video_Interpolation_via_Structure-to-Texture_Generation_CVPR_2020_paper.pdf?ref=https://githubhelp.com>., 2020, 10 Pages.
Ha, Taehyeun et al., "Motion Compensated Frame Interpolation by new Block-based Motion Estimation Algorithm", IEEE Transactions on Consumer Electronics vol. 50, No. 2 [retrieved May 17, 2022]. Retrieved from the Internet <https://doi.org/10.1109/TCE.2004.1309458>., May 1, 2004, 8 pages.
He, Kaiming et al., "Delving Deep into Rectifiers: Surpassing Human-Level Performance on ImageNet Classification", IEEE International Conference on Computer Vision [retrieved Feb. 21, 2022]. Retrieved from the Internet <http://cv.znu.ac.ir/afsharchim/DeepL/paper/kiaming.pdf>., Feb. 6, 2015, 11 Pages.
Herbst, Evan et al., "Occlusion Reasoning for Temporal Interpolation using Optical Flow", University of Washington Computer Science Department [retrieved Feb. 21, 2022]. Retrieved from the Internet <https://www.microsoft.com/en-us/research/wp-content/uploads/2009/08/UW-CSE-09-08-01.pdf>., Jul. 29, 2009, 41 Pages.

(56) References Cited

OTHER PUBLICATIONS

Holynski, Aleksander et al., "Animating Pictures with Eulerian Motion Fields", Cornell University arXiv, arXiv.org [retrieved Feb. 22, 2022]. Retrieved from the Internet <https://arxiv.org/pdf/2011.15128.pdf>., Nov. 30, 2020, 10 Pages.

Huang, Ai-Mei et al., "Correlation-Based Motion Vector Processing With Adaptive Interpolation Scheme for Motion-Compensated Frame Interpolation", IEEE Transactions on Image Processing [retrieved Feb. 22, 2022]. Retrieved from the Internet <http://citeseerx.ist.psu.edu/viewdoc/download?doi=10.1.1.468.525&rep=rep1&type=pdf>., Mar. 10, 2009, 13 Pages.

Huang, Zhewei et al., "RIFE: Real-Time Intermediate Flow Estimation for Video Frame Interpolation", Cornell University arXiv, arXiv.org [retrieved Feb. 15, 2022]. Retrieved from the Internet <https://arxiv.org/pdf/2011.06294.pdf>., Nov. 17, 2021, 12 Pages.

Jaderberg, Max et al., "Spatial Transformer Networks", In Advances in neural information processing systems [retrieved Feb. 22, 2022]. Retrieved from the Internet <https://arxiv.org/pdf/1506.02025.pdf>., Feb. 4, 2016, 14 pages.

Jeong, Seong-Gyun et al., "Motion-Compensated Frame Interpolation Based on Multihypothesis Motion Estimation and Texture Optimization", IEEE Transactions on Image Processing vol. 22, No. 11 [retrieved May 17, 2022]. Retrieved from the Internet <https://doi.org/10.1109/TIP.2013.2274731>., Jul. 24, 2013, 13 pages.

Jiang, Huaizu et al., "Super SloMo: High Quality Estimation of Multiple Intermediate Frames for Video Interpolation", Cornell University arXiv, arXiv.org [retrieved Feb. 15, 2022]. Retrieved from the Internet <https://arxiv.org/pdf/1712.00080.pdf>., Jul. 13, 2018, 12 Pages.

Kalluri, Tarun et al., "FLAVR: Flow-Agnostic Video Representations for Fast Frame Interpolation", Cornell University arXiv, arXiv.org [retrieved Feb. 15, 2022]. Retrieved from the Internet <https://arxiv.org/pdf/2012.08512.pdf>., Apr. 15, 2021, 15 Pages.

Kim, Soo Ye , "FISR: Dee Joint Frame Interpolation and Super-Resolution with a Multi-Scale Temporal Loss", Proceedings of the AAAI Conference on Artificial Intelligence, vol. 34, No. 7 [retrieved Feb. 22, 2022]. Retrieved from the Internet <https://ojs.aaai.org/index.php/AAAI/article/view/6788>., Apr. 3, 2020, 9 Pages.

Kim, Soo Ye et al., "FISR: Deep Joint Frame Interpolation and Super-Resolution With a Multi-Scale Temporal Loss", Proceedings of the AAAI Conference on Artificial Intelligence vol. 34, No. 7 [retrieved Feb. 22, 2022]. Retrieved from the Internet <https://ojs.aaai.org/index.php/AAAI/article/view/6788>., Apr. 3, 2020, 9 Pages.

Kolda, Tamara et al., "Tensor Decompositions and Applications", Siam Review vol. 51, No. 3 [retrieved Feb. 15, 2022]. Retrieved from the Internet <https://www.cs.umd.edu/class/fall2018/cmsc498V/slides/TensorBasics.pdf>., 2009, 46 Pages.

Kroeger, Till et al., "Fast Optical Flow using Dense Inverse Search", Cornell University arXiv, arXiv.org [retrieved Feb. 15, 2022]. Retrieved from the Internet <https://arxiv.org/pdf/1603.03590.pdf>., Mar. 11, 2016, 25 Pages.

Lee, Hyeongmin et al., "AdaCoF: Adaptive Collaboration of Flows for Video Frame Interpolation", Cornell University arXiv, arXiv.org [retrieved Feb. 15, 2022]. Retrieved from the Internet <https://arxiv.org/pdf/1907.10244.pdf>., Mar. 8, 2020, 10 Pages.

Li, Haopeng et al., "Video Frame Interpolation Via Residue Refinement", IEEE International Conference on Acoustics, Speech and Signal Processing (ICASSP) [retrieved Feb. 16, 2022]. Retrieved from the Internet <http://crabwq.github.io/pdf/2020%20Video%20Frame%20Interpolation%20via%20Residue%20Refinement.pdf>., May 2020, 5 Pages.

Li, Zhengqi et al., "Neural Scene Flow Fields for Space-Time View Synthesis of Dynamic Scenes", Cornell University arXiv, arXiv.org [retrieved Feb. 22, 2022]. Retrieved from the Internet <https://arxiv.org/pdf/2011.13084.pdf>., Apr. 21, 2021, 11 Pages.

Lin, Songnan et al., "Learning Event-Driven Video Deblurring and Interpolation", European Conference on Computer Vision [retrieved Feb. 22, 2022]. Retrieved from the Internet <http://www.ecva.net/papers/eccv_2020/papers_ECCV/papers/123530681.pdf>., Nov. 2020, 16 Pages.

Liu, Yihao et al., "Enhanced Quadratic Video Interpolation", Cornell University arXiv, arXiv.org [retrieved Feb. 16, 2022]. Retrieved from the Internet <https://arxiv.org/pdf/2009.04642.pdf>., Sep. 10, 2020, 16 Pages.

Liu, Yu-Lun et al., "Deep Video Frame Interpolation Using Cyclic Frame Generation", Proceedings of the AAAI Conference on Artificial Intelligence vol. 33, No. 1 [retrieved Feb. 23, 2022]. Retrieved from the Internet <https://ojs.aaai.org/index.php/AAAI/article/view/4905>., Jul. 17, 2019, 9 Pages.

Liu, Ziwei et al., "Video Frame Synthesis Using Deep Voxel Flow", Cornell University arXiv, arXiv.org [retrieved Feb. 16, 2022]. Retrieved from the Internet <https://arxiv.org/pdf/1702.02463.pdf>., Aug. 5, 2017, 9 Pages.

Loshchilov, Ilya et al., "Fixing Weight Decay Regularization in Adam", ICLR 2018 Conference Blind Submission [retrieved Feb. 16, 2022]. Retrieved from the Internet <https://openreview.net/pdf?id=rk6qdGgCZ>., Feb. 15, 2018, 14 Pages.

Luo, Kunming et al., "UPFlow: Upsampling Pyramid for Unsupervised Optical Flow Learning", Cornell University arXiv, arXiv.org [retrieved Feb. 23, 2022]. Retrieved from the Internet <https://arxiv.org/pdf/2012.00212.pdf>., Jun. 2, 2021, 10 Pages.

Mahajan, Dhruv et al., "Moving gradients: a path-based method for plausible image interpolation", ACM Transactions on Graphics vol. 28, No. 3 [retrieved Feb. 23, 2022]. Retrieved from the Internet <http://citeseerx.ist.psu.edu/viewdoc/download?doi=10.1.1.437.2373&rep=rep1&type=pdf>., Jul. 27, 2009, 10 Pages.

Meister, Simon et al., "UnFlow: Unsupervised Learning of Optical Flow with a Bidirectional Census Loss", Cornell University arXiv, arXiv.org [retrieved Feb. 16, 2022]. Retrieved from the Internet <https://arxiv.org/pdf/1711.07837.pdf>., Nov. 21, 2017, 9 Pages.

Meyer, Simone et al., "Deep Video Color Propagation", Cornell University arXiv, arXiv.org [retrieved Feb. 16, 2022]. Retrieved from the Internet <https://arxiv.org/pdf/1808.03232.pdf>., Aug. 9, 2018, 15 Pages.

Meyer, Simone et al., "Phase-Based Frame Interpolation for Video", IEEE Conference on Computer Vision and Pattern Recognition (CVPR) [retrieved Feb. 16, 2022]. Retrieved from the Internet <http://citeseerx.ist.psu.edu/viewdoc/download?doi=10.1.1.929.6360&rep=rep1&type=pdf>., 2015, 9 Pages.

Meyer, Simone et al., "PhaseNet for Video Frame Interpolation", IEEE Conference on Computer Vision and Pattern Recognition (CVPR) [retrieved Feb. 16, 2022]. Retrieved from the Internet <https://openaccess.thecvf.com/content_cvpr_2018/CameraReady/1790.pdf>., 2018, 10 Pages.

Nguyen-Phuoc, Thu H. et al., "RenderNet: A deep convolutional network for differentiable rendering from 3D shapes", Cornell University arXiv, arXiv.org [retrieved Feb. 23, 2022]. Retrieved from the Internet <https://arxiv.org/pdf/1806.06575.pdf>., Apr. 1, 2019, 17 Pages.

Niklaus, Simon et al., "Context-Aware Synthesis for Video Frame Interpolation", Cornell University arXiv, arXiv.org [retrieved Feb. 16, 2022]. Retrieved from the Internet <https://arxiv.org/pdf/1803.10967.pdf>., Mar. 29, 2018, 10 Pages.

Niklaus, Simon et al., "Learned Dual-View Reflection Removal", Cornell University arXiv, arXiv.org [retrieved Feb. 24, 2022]. Retrieved from the Internet <https://arxiv.org/pdf/2010.00702.pdf>., Oct. 1, 2020, 10 Pages.

Niklaus, Simon et al., "Revisiting Adaptive Convolutions for Video Frame Interpolation", Cornell University arXiv, arXiv.org [retrieved Feb. 16, 2022]. Retrieved from the Internet <https://arxiv.org/pdf/2011.01280.pdf>., Nov. 2, 2020, 11 Pages.

Niklaus, Simon et al., "Softmax Splatting for Video Frame Interpolation", Cornell University arXiv, arXiv.org [retrieved Feb. 16, 2022]. Retrieved from the Internet <https://arxiv.org/pdf/2003.05534.pdf>., Mar. 11, 2020, 10 Pages.

Niklaus, Simon et al., "Video Frame Interpolation via Adaptive Convolution", Cornell University arXiv, arXiv.org [retrieved Feb. 16, 2022]. Retrieved from the Internet <https://arxiv.org/pdf/1703.07514.pdf>., Mar. 22, 2017, 10 Pages.

Niklaus, Simon et al., "Video Frame Interpolation via Adaptive Separable Convolution", Cornell University arXiv, arXiv.org [retrieved Feb. 16, 2022]. Retrieved from the Internet <https://arxiv.org/pdf/1708.01692.pdf>., Aug. 5, 2017, 10 Pages.

(56) References Cited

OTHER PUBLICATIONS

Paliwal, Avinash et al., "Deep Slow Motion Video Reconstruction with Hybrid Imaging System", Cornell University arXiv, arXiv.org [retrieved Feb. 23, 2022]. Retrieved from the Internet <https://arxiv.org/pdf/2002.12106.pdf>., Apr. 2, 2020, 12 Pages.

Park, Junheum et al., "Asymmetric Bilateral Motion Estimation for Video Frame Interpolation", Cornell University arXiv, arXiv.org [retrieved Feb. 16, 2022]. Retrieved from the Internet <https://arxiv.org/pdf/2108.06815.pdf>., Aug. 15, 2021, 10 Pages.

Park, Junheum et al., "BMBC: Bilateral Motion Estimation with Bilateral Cost Volume for Video Interpolation", Cornell University arXiv, arXiv.org [retrieved Feb. 16, 2022]. Retrieved from the Internet <https://arxiv.org/pdf/2007.12622.pdf>., Jul. 17, 2020, 16 Pages.

Peleg, Tomer et al., "IM-Net for High Resolution Video Frame Interpolation", IEEE/CVF Conference on Computer Vision and Pattern Recognition [retrieved Feb. 16, 2022]. Retrieved from the Internet <https://openaccess.thecvf.com/content_CVPR_2019/papers/Peleg_IM-Net_for_High_Resolution_Video_Frame_Interpolation_CVPR_2019_paper.pdf>., 2019, 10 Pages.

Phan, Anh-Huy et al., "Stable Low-Rank Tensor Decomposition for Compression of Convolutional Neural Network", Cornell University arXiv, arXiv.org [retrieved Feb. 16, 2022]. Retrieved from the Internet <https://arxiv.org/pdf/2008.05441.pdf>., Aug. 12, 2020, 18 Pages.

Reda, Fitsum A. et al., "Unsupervised Video Interpolation Using Cycle Consistency", Cornell University arXiv, arXiv.org [retrieved Feb. 16, 2022]. Retrieved from the Internet <https://arxiv.org/abs/1906.05928>., Mar. 28, 2021, 10 Pages.

Roberts, Richard et al., "Learning general optical flow subspaces for egomotion estimation and detection of motion anomalies", IEEE Conference on Computer Vision and Pattern Recognition [retrieved Feb. 16, 2022]. Retrieved from the Internet <https://projet.liris.cnrs.fr/imagine/pub/proceedings/CVPR-2009/data/papers/2129.pdf>., 2009, 8 Pages.

Sevilla-Lara, Laura et al., "Optical Flow With Semantic Segmentation and Localized Layers", Cornell University arXiv, arXiv.org [retrieved Feb. 16, 2022]. Retrieved from the Internet <https://arxiv.org/pdf/1603.03911.pdf>., Apr. 11, 2016, 10 Pages.

Shade, Jonathon et al., "Layered Depth Images", ACM 1998, the 25th annual conference on computer graphics and interactive techniques [retrieved Feb. 23, 2022]. Retrieved from the Internet <http://citeseerx.ist.psu.edu/viewdoc/download?doi=10.1.1.1004.2001&rep=rep1&type=pdf>., Jul. 24, 1998, 13 Pages.

Shen, Wang et al., "Blurry Video Frame Interpolation", Cornell University arXiv, arXiv.org [retrieved Feb. 23, 2022]. Retrieved from the Internet <https://arxiv.org/pdf/2002.12259.pdf>., Feb. 27, 2020, 10 Pages.

Shi, Zhihao et al., "Video Interpolation via Generalized Deformable Convolution", Cornell University arXiv, arXiv.org [retrieved Feb. 23, 2022]. Retrieved from the Internet <https://arxiv.org/pdf/2008.10680.pdf>., Mar. 18, 2021, 13 Pages.

Sim, Hyeonjun et al., "XVFI: eXtreme Video Frame Interpolation", Cornell University arXiv, arXiv.org [retrieved Feb. 16, 2022]. Retrieved from the Internet <http://128.84.21.203/pdf/2103.16206>., Aug. 5, 2021, 18 Pages.

Siyao, Li et al., "Deep Animation Video Interpolation in the Wild", Cornell University arXiv, arXiv.org [retrieved Feb. 16, 2022]. Retrieved from the Internet <https://arxiv.org/pdf/2104.02495.pdf>., Apr. 6, 2021, 9 Pages.

Soomro, Khurram et al., "UCF101: A Dataset of 101 Human Actions Classes From Videos in The Wild", Cornell University arXiv, arXiv.org [retrieved Feb. 16, 2022]. Retrieved from the Internet <https://arxiv.org/pdf/1212.0402.pdf>., Dec. 3, 2012, 7 Pages.

Sun, Deqing et al., "PWC-Net: CNNs for Optical Flow Using Pyramid, Warping, and Cost Volume", Cornell University arXiv, arXiv.org [retrieved Feb. 16, 2022]. Retrieved from the Internet <http://arxiv-export-lb.library.cornell.edu/pdf/1709.02371>., Jun. 25, 2018, 18 Pages.

Tang, Chengzhou et al., "LSM: Learning Subspace Minimization for Low-Level Vision", Cornell University arXiv, arXiv.org [retrieved Feb. 16, 2022]. Retrieved from the Internet <https://arxiv.org/pdf/2004.09197.pdf>., Apr. 20, 2020, 13 Pages.

Teed, Zachary et al., "RAFT: Recurrent All-Pairs Field Transforms for Optical Flow", Cornell University arXiv, arXiv.org [retrieved Feb. 23, 2022]. Retrieved from the Internet <https://arxiv.org/pdf/2003.12039.pdf>., Aug. 25, 2020, 21 Pages.

Tulyakov, Stepan et al., "TimeLens: Event-based Video Frame Interpolation", Cornell University arXiv, arXiv.org [retrieved Feb. 16, 2022]. Retrieved from the Internet <https://arxiv.org/pdf/2106.07286.pdf>., Jun. 14, 2021, 14 Pages.

Wang, Yang et al., "GIF2Video: Color Dequantization and Temporal Interpolation of GIF Images", Cornell University arXiv, arXiv.org [retrieved Feb. 23, 2022]. Retrieved from the Internet <https://arxiv.org/pdf/1901.02840.pdf>., Apr. 8, 2019, 10 Pages.

Wang, Zihao W. et al., "Event-driven Video Frame Synthesis", Cornell University arXiv, arXiv.org [retrieved Feb. 23, 2022]. Retrieved from the Internet <https://arxiv.org/pdf/1902.09680.pdf>., Jul. 6, 2019, 10 Pages.

Wu, Chao-Yuan et al., "Video Compression through Image Interpolation", Cornell University arXiv, arXiv.org [retrieved Feb. 16, 2022]. Retrieved from the Internet <https://arxiv.org/pdf/1804.06919.pdf>., Apr. 18, 2018, 18 Pages.

Xiang, Xiaoyu et al., "Zooming Slow-Mo: Fast and Accurate One-Stage Space-Time Video Super-Resolution", Cornell University arXiv, arXiv.org [retrieved Feb. 23, 2022]. Retrieved from the Internet <https://arxiv.org/pdf/2002.11616.pdf>., Feb. 26, 2020, 12 Pages.

Xu, Xiangyu et al., "Quadratic video interpolation", Cornell University arXiv, arXiv.org [retrieved Feb. 23, 2022]. Retrieved from the Internet <https://arxiv.org/pdf/1911.00627.pdf>., Nov. 2, 2019, 10 Pages.

Xue, Tianfan et al., "Video Enhancement with Task-Oriented Flow", Cornell University arXiv, arXiv.org [retrieved Feb. 16, 2022]. Retrieved from the Internet <https://arxiv.org/pdf/1711.09078.pdf>., Nov. 10, 2019, 20 Pages.

Yu, Zhiyang et al., "Training Weakly Supervised Video Frame Interpolation With Events", IEEE/CVF International Conference on Computer Vision (ICCV) [retrieved Feb. 16, 2022]. Retrieved from the Internet <https://openaccess.thecvf.com/content/ICCV2021/papers/Yu_Training_Weakly_Supervised_Video_Frame_Interpolation_With_Events_ICCV_2021_paper.pdf>., Oct. 2021, 10 Pages.

Yuan, Liangzhe et al., "Zoom-In-To-Check: Boosting Video Interpolation via Instance-Level Discrimination", Cornell University arXiv, arXiv.org [retrieved Feb. 16, 2022]. Retrieved from the Internet <https://arxiv.org/pdf/1812.01210.pdf>., Apr. 28, 2019, 9 Pages.

Zhang, Haoxian et al., "A Flexible Recurrent Residual Pyramid Network for Video Frame Interpolation", Computer Vision—ECCV [retrieved Feb. 16, 2022]. Retrieved from the Internet <http://www.ecva.net/papers/eccv_2020/papers_ECCV/papers/123700477.pdf>., Nov. 2020, 17 Pages.

Zhang, Shipeng et al., "Learning Tensor Low-Rank Prior for Hyperspectral Image Reconstruction", IEEE Ccvpr [retrieved Feb. 16, 2022]. Retrieved from the Internet <https://openaccess.thecvf.com/content/CVPR2021/papers/Zhang_Learning_Tensor_Low-Rank_Prior_for_Hyperspectral_Image_Reconstruction_CVPR_2021_paper.pdf?ref=https://githubhelp.com>. , Jun. 2021, 10 Pages.

Zhang, Youjian et al., "Video Frame Interpolation without Temporal Priors", Cornell University arXiv, arXiv.org [retrieved Feb. 16, 2022]. Retrieved from the Internet <https://arxiv.org/pdf/2112.01161.pdf>., Dec. 2, 2021, 11 Pages.

Zhao, Lili et al., "RAI-Net: Range-Adaptive LiDAR Point Cloud Frame Interpolation Network", Cornell University arXiv, arXiv.org [retrieved Feb. 23, 2022]. Retrieved from the Internet <https://arxiv.org/pdf/2106.00496.pdf>., Jun. 1, 2021, 6 Pages.

Zitnick, C et al., "High-quality Video View Interpolation Using a Layered Representation", ACM Transactions on Graphics vol. 23, No. 3 [retrieved Feb. 23, 2022]. Retrieved from the Internet <https://

(56) References Cited

OTHER PUBLICATIONS www.microsoft.com/en-us/research/wp-content/uploads/2016/02/ZitnickSig04.pdf>., Aug. 2004, 9 pages.

* cited by examiner

SPLATTING-BASED DIGITAL IMAGE SYNTHESIS

BACKGROUND

Digital image synthesis techniques are employed by computing devices to synthesize a digital image from another digital image. These techniques are used in a variety of scenarios, examples of which include animation "inbetweening," video compression, video editing, motion blur synthesis, and so forth. Another common example involves synthesizing the digital image as a frame disposed "between" two other frames in a sequence, e.g., to form a digital video or animation having a plurality of frames.

Early conventional techniques to do so involve use of block motion estimation and compensation using performance constraints, which provide inconsistent results. Graphics accelerators were then developed to provide sufficient computational resources in support of dense motion estimation and compensation. As such, this typically involves heavy use of neural networks and a corresponding heavy use of computational resources used to implement these techniques. For example, conventional frame interpolation approaches that employ deep learning involve fully executing an entirety of a neural network for each output frame in order to resolve visual artifacts in the synthesized digital images. As such, these techniques become unwieldly in instances involving multiple frames, frames that have a high resolution, and so forth. Accordingly, execution of conventional techniques by computing devices becomes untenable in common usage scenarios due to this resource consumption.

SUMMARY

Digital image synthesis techniques are described that leverage splatting, i.e., forward warping. In one example, a first digital image and a first optical flow are received by a digital image synthesis system. The first optical flow describes pixel movement of the first digital image to a second digital image. A splat metric is constructed by the digital image synthesis system that defines a weighted map of respective pixels of the first digital image based on a parameter, e.g., photometric consistency, optical flow consistency, optical flow variance, depth maps, and so on.

From this, the digital image synthesis system produces a first warped optical flow and a first warp merge metric corresponding to an interpolation instant by forward warping the first optical flow based on the splat metric and the merge metric. A first warped digital image corresponding to the interpolation instant is formed by the digital image synthesis system by backward warping the first digital image based on the first warped optical flow. The first warp merge metric is constructed by the digital image synthesis system that defines a weighted map of respective pixels of the first warped digital image, e.g., based on the parameter.

The digital image synthesis system then synthesizes a synthesized digital image by combining the first warped digital image with a second warped digital image. This is performed based on the first warp merge metric and a second warp merge metric that defines accuracy of respective pixels within the first and second images.

A variety of other improvements are also described. Examples of these improvements include use of downsampling to increase computational resource consumption efficiency as well as accuracy in generating optical flows, use of Gaussian kernels to generate warped optical flows for respective interpolation instants, an ability to use three or more frames to synthesize a digital image, weight adjustment techniques based on a maximum pixel values at respective locations to address conventional situations involving numerical instability, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Conventional digital image synthesis techniques are computationally-resource intensive. This is because conventional usage scenarios employ neural networks that are executed in their entirety in order to generate each instance of a digital image in order to resolve visual artifacts. Consequently, these conventional techniques consume significant amounts of computational resources and are ill suited for repeated implementation using typical computing devices.

Figure 10:
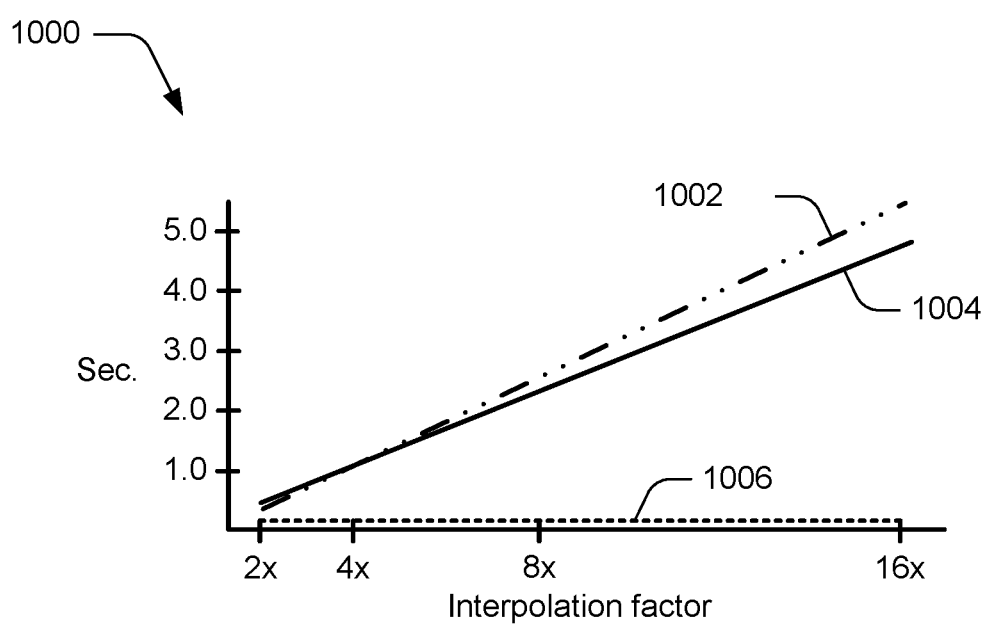
FIG. 10 depicts a chart illustrating improvements in computing device operation realized through use of the spatting-based digital image synthesis techniques described herein.

As shown in an example chart 1000 of FIG. 10, for instance, execution of a first conventional technique 1002 to interpolate a given digital image by a factor of eight instead of a factor of two involves eight times the computational resources. The same is observable in a second conventional technique 1004 that involves estimating optical flow between input frames and then warping feature pyramids to a desired interpolation instant before employing a neural network to yield a final result. This is because this second conventional technique 1004 also involves repeated execution of an entirety of a neural network for each frame, again involving a corresponding increase in computational resource consumption.

Accordingly, digital image synthesis techniques are described that leverage splatting, i.e., forward warping. In these techniques, synthesis of the digital image involves a few milliseconds each time as shown at the current splatting technique 1006. In the techniques described herein, for example, spatting of an optical flow is followed by backwards warping to generate frames without involving repeated use of an entirety of a neural network to refine the frames as involved in conventional techniques. This is achievable due to the increased visual accuracy of the described digital image synthesis techniques. Accordingly, interpolation of a given digital video by a factor of eight instead of by a factor of two involves minimal additional use of computation resources. This results in a corresponding improvement in operation of underlying computing devices that implement these techniques.

A variety of other improvements are also described in the following sections. Examples of these improvements include use of downsampling to increase computational resource consumption efficiency as well as accuracy in generating optical flows, use of Gaussian kernels to generate warped optical flows for respective interpolation instants, an ability to use three or more frames to synthesize a digital image, weight adjustment techniques based on a maximum pixel values at respective location to address conventional situations involving numerical instability, and so forth.

In one example, the digital synthesis techniques are used to synthesize a digital image at an interpolation instant between a first digital image and a second digital image. A digital image synthesis system, for instance, receives the digital images as well as an input identifying an interpolation instant "t" defining a point in time in the movement of pixels between the first and second digital images, e.g., at a point in time halfway between the movement between the frames.

An optical flow generation module is then employed to generate optical flows. A first optical flow is generated that describes movement of pixels from the first digital image to the second digital image. A second optical flow is also generated that describes movement of pixels from the second digital image to the first digital image. Thus, the interpolation instant is a point in time with respect to movements.

The digital images and optical flows are then received as an input by an interpolation system. The interpolation system is configured to generate warped digital images, which are then combined by a synthesis module to generate a synthesized digital image. To do so, warp merge metrics are generated by the interpolation system for the first and second digital images, respectively. The warp merge metrics define respective importance of individual pixels of the warped digital images. As such, these metrics are usable to combine the warped digital images in an efficient manner without reliance on subsequent refinement using a neural network as is involved in conventional techniques.

In order to generate the warped digital images and warp merge metric for the first digital image, the interpolation system receives an input identifying the interpolation instant "t" with respect to the optical flows, the first digital image, and the first optical flow. A metric construction module is employed to generate a splat metric. The splat metric is formed based on parameters that quantify an expected accuracy (e.g., confidence) of respective pixels in the first digital image and the first optical flow, respectively. Examples of these parameter include photometric consistency, optical flow consistency, optical flow variance, depth values, and so forth. This results in a splat metric configured as a weighted map defining relative importance of respective pixels of the digital image. The splat metric is usable to resolve ambiguities encountered when multiple pixels are mapped to a same location at the interpolation instant "t."

A splatting module is then employed by the interpolation system that accepts as an input the first optical flow, the first splat metric, and the first merge metric. The splatting module is configured to forward warp the first optical flow based on the metrics to form a first warped optical flow that corresponds to the interpolation instant "t," i.e., a relative point in time in movement between frames.

The first warped optical flow is then used along with the first digital image to generate a first warped digital image using backward warping that corresponds to the interpolation instant "t." A first warped metric is also generated by the spatting module as part of generating the first warped digital image. As previously described, this first warped metric describes relative importance of pixels in the first warped digital image as a weighted map, which is performable using one or more parameters described above.

In conventional splatting techniques, visual artifacts (e.g., holes) are often encountered due to divergent flow fields in the optical flow, occlusions, and so forth. Accordingly, in one example the interpolation system employs a Gaussian kernel (e.g., a 4×4 Gaussian kernel) instead of a default bilinear splatting kernel (e.g., typically defined as 2×2) for splatting the optical flows. Use of a wider kernel typically leads to blurry results when spatting colors. However, use of the Gaussian kernel to splat the optical flows (followed by backward warping) avoids these potential inaccuracies and visual artifacts and as such overcomes challenges in conventional techniques and improves operation of underlying computing devices. Similar techniques are also usable following the techniques described above to generate a second warped digital image and a second warp merge metric based on the second digital image and second optical flow. As previously described, this is also performable for additional digital images (e.g., for a third digital image and third optical flow to generate a third warped digital image and third warp merge metric, etc.) to further improve accuracy by leveraging respective merge metrics.

A synthesis module is then employed to generate a synthesized digital image by combining the warped digital images based on respective warp merge metrics. The warp merge metrics define relative importance of pixels of the warped digital image, which is based on a calculated degree of accuracy and/or confidence in the pixels. This is used to suppress influence of unreliable pixels when generating the synthesized digital image, e.g., to address movement at borders of an object. In this way, the splatting and backward warping techniques support accuracy in generation of the warped digital images and a subsequent synthesized digital image. This is performable without use of conventional refinement techniques typically implemented using neural networks. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Image Synthesis Environment

Figure 1:
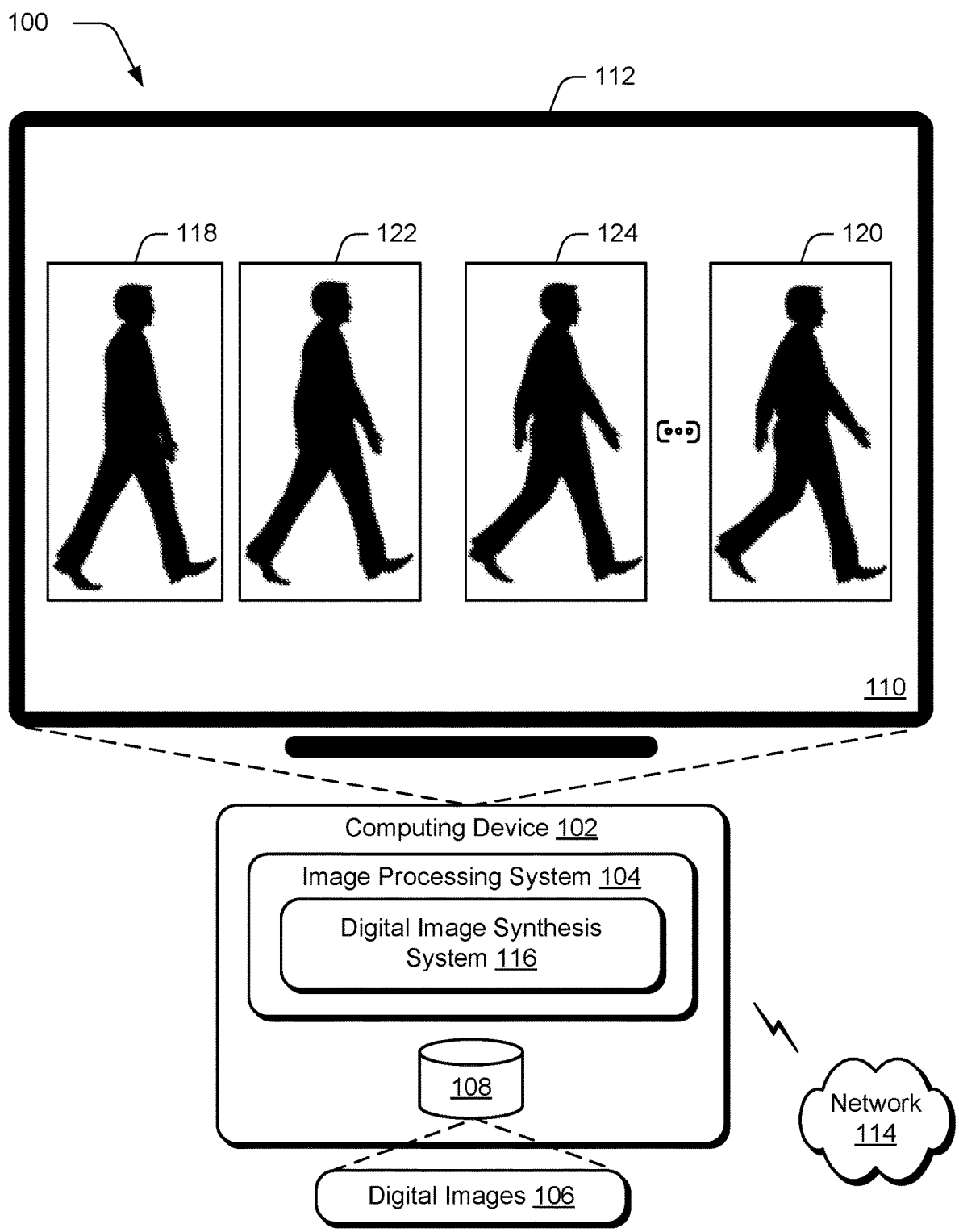
FIG. 1 is an illustration of an environment in an example implementation that is operable to employ splatting-based digital image synthesis techniques described herein.

FIG. 1 is an illustration of a digital medium digital image synthesis environment 100 in an example implementation that is operable to employ techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the image 106 is illustrated as a digital image synthesis system 116. The digital image synthesis system 116 is representative of functionality to synthesize a digital image 106 based on another digital image. Image synthesis techniques are employed in a wide range of usage scenarios, examples of which include animation "inbetweening," video compression, video editing, motion blur synthesis, and so forth. Another example involves automated synthesizing of the digital image as a frame disposed "between" two other frames in sequence, e.g., to form a digital video or animation having a plurality of frames.

In the illustrated implementation in the user interface 110, for instance, a first digital image 118 and a second digital image 120 are utilized as a basis by the digital image synthesis system 116 to synthesize a plurality of digital images, examples of which include a first synthesized digital image 122 and a second synthesized digital image 124. The first and second synthesized digital images 122, 124 correspond to interpolation instants at respective times in motion exhibited between the first and second digital images 118, 120, e.g., based on one or more optical flows generated from the images.

A variety of conventional techniques have been employed to support frame interpolation, however these techniques can introduce visual artifacts, incur significant computational resource costs, and so on. Initial conventional examples are based on block-level motion estimates that include overlapping block motion compensation, adaptively handling overlapping blocks, detecting and handling occlusions, considering multiple motion estimates, and estimating a dense motion field at the interpolation instant. In another conventional example, motion compensation is based on dense estimates that includes layered warping, occlusion reasoning for temporal interpolation, warping with transition points, and using warping as a metric to evaluate optical flow.

Although splatting (also referred to as forward warping) has been used in some conventional scenarios, these scenarios involve deep learning using machine learning techniques to resolve visual artifacts caused by inaccuracies in the techniques. Thus, these conventional splatting techniques are not differentiable or capable of being parallelized, which prohibits use of ordering and selecting a candidate flow in cases where multiple source pixels map to the same target location or iteratively filling holes. In contrast, the digital image synthesis system 116 supports differentiable operations as part of digital image synthesis that are capable of being parallelized through use of optical flow splatting and backward warping. Further, these the digital image synthesis system 116 is trainable end-to-end and therefore improve accuracy of components contained therein as further described below.

Another conventional category of conventional frame interpolation approaches accepts two digital images as an input and interpolates a frame at a time between the inputs. Each of these conventional techniques, however, involve use of a neural network to infer the interpolation result at a desired instant. The conventional techniques either use a neural network to refine warped representations of the input images or use a neural network to infer the motion from the desired interpolation instant to the input images. Use of such neural networks, however, is computationally challenging, especially at high resolutions. This is in contrast to splatting-based synthesis techniques utilized by the digital image synthesis system 116 where, given optical flow estimates between digital images 106, synthesizes the interpolation result (i.e., a synthesized digital image) at a point in time by using relatively few primitive image operations that are computationally efficient. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Splatting-Based Digital Image Synthesis

The following discussion describes splatting-based digital image synthesis techniques that are implementable utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-12 and in parallel to the procedure 900 of FIG. 9.

Figure 2:
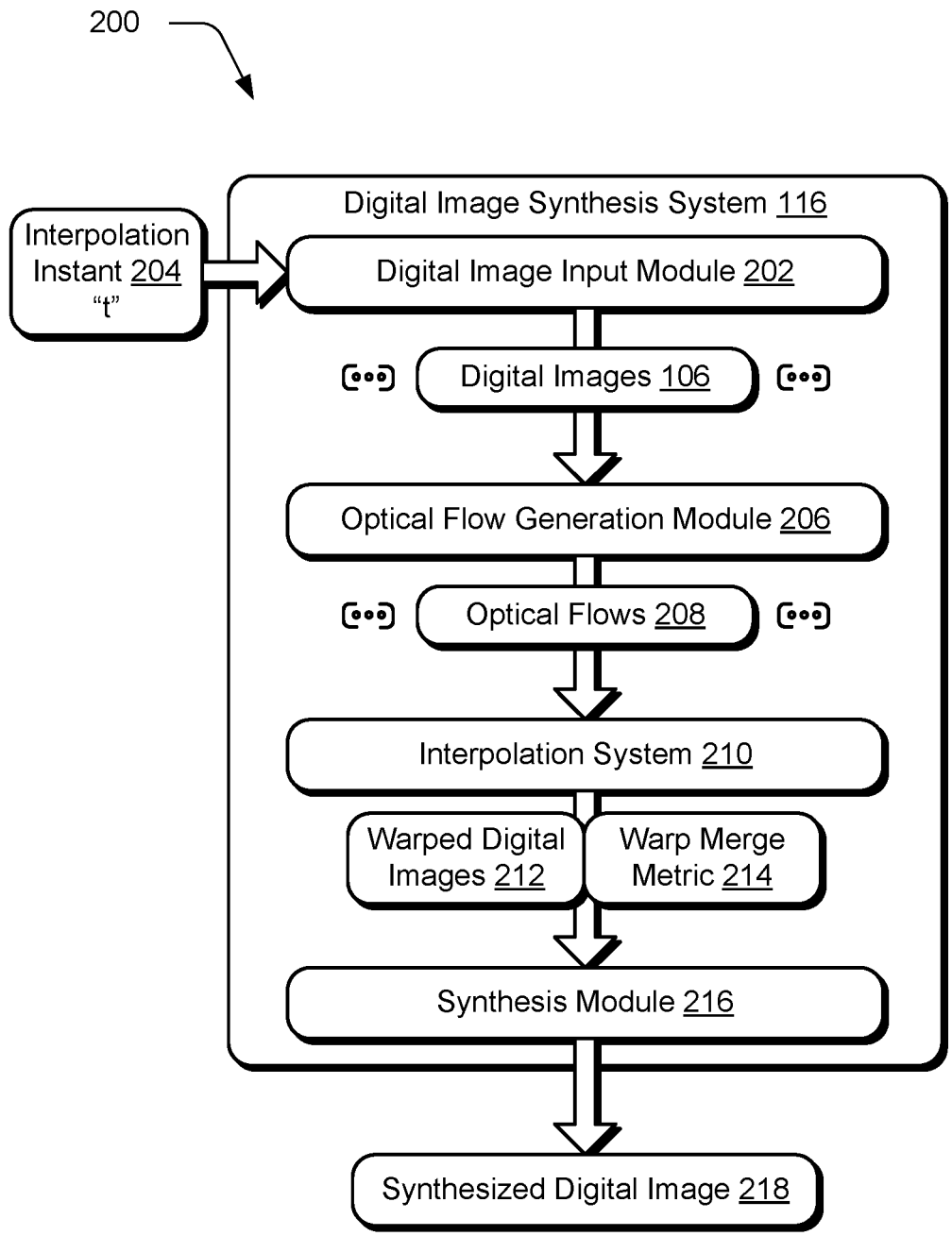
FIG. 2 depicts a system in an example implementation showing operation of a digital image synthesis system of FIG. 1 in greater detail.

FIG. 2 depicts a procedure 200 in an example implementation showing operation of the digital image synthesis system 116 in greater detail as automatically synthesizing a digital image. The digital image synthesis system 116 includes a digital image input module 202 that is configured to receive an input specifying digital images 106 (e.g., first and second digital images (block 902)) that are to be used as a basis to synthesize a digital image as well as an input specifying an interpolation instant 204 "t." The interpolation instant 204 defines a relative amount of time with respect to movement between first and second digital frames, e.g., on a scale from zero to one. An interpolation instant of "0.5," for instance, defines a midway point in the movement between first and second digital images, e.g., frames.

An optical flow generation module 206 is then utilized to produce optical flows 208 based on the digital images 106. In a two-image bidirectional example, the optical flow generation module 206 produces an optical flow from a first digital image to a second digital image. A second optical flow is also produced from the second digital image to the first digital image (block 904). Optical flow is a pattern of apparent motion within a visual scene caused by relative motion between an observer and the scene. Techniques usable to estimate optical flow include phase correlation, block-based techniques, estimation of motion as instantaneous image velocities, differential techniques, variational techniques, discrete image displacements, discrete optimization techniques, gradient-based optical flow, and so forth.

Figure 3:
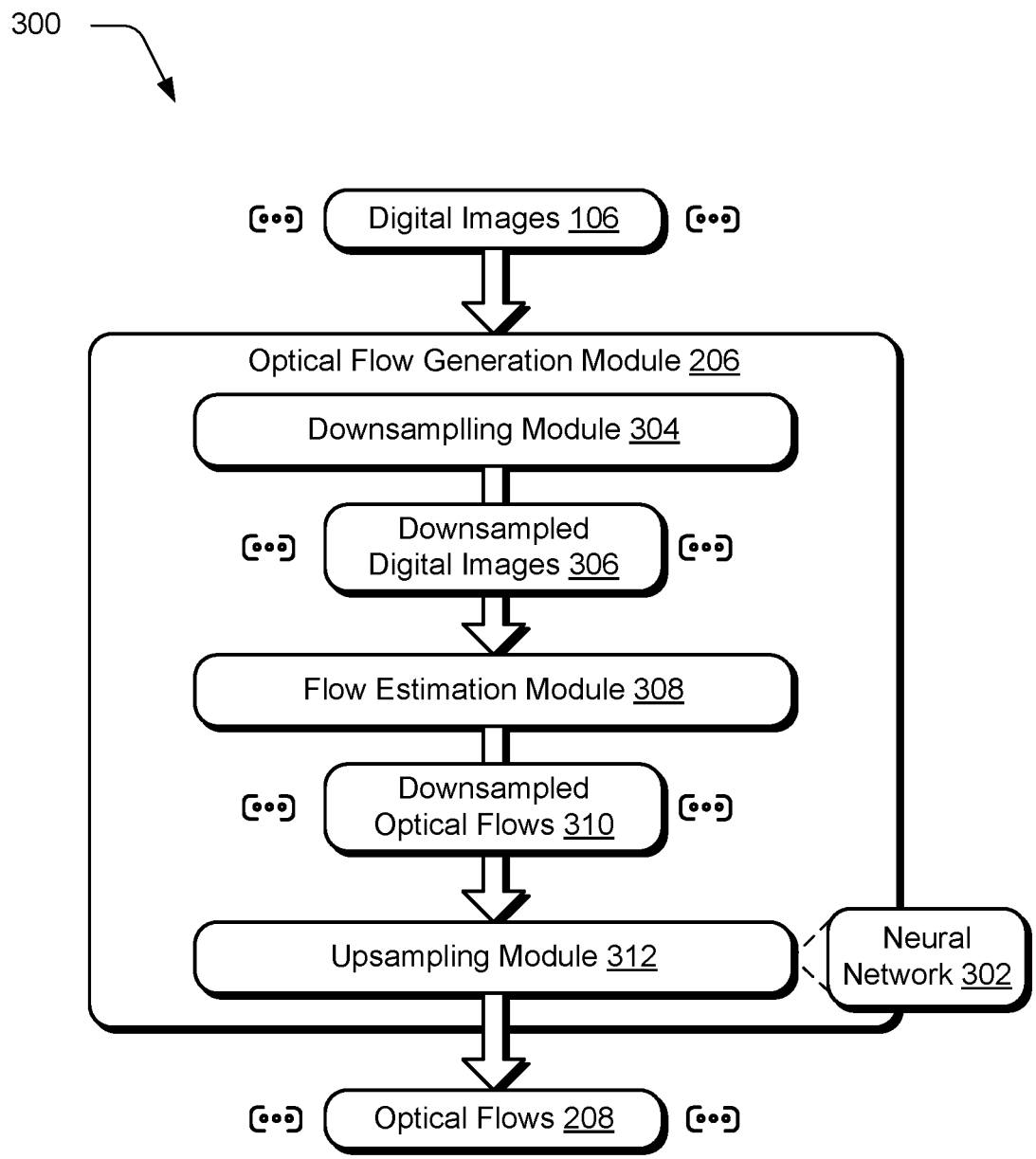
FIG. 3 depicts an example of operation of an optical flow generation module of FIG. 2 in greater detail as employing downsampling and upsampling techniques.

FIG. 3 depicts an example 300 of operation of the optical flow generation module 206 in greater detail as employing downsampling and upsampling techniques that support increased computational resource efficiency and accuracy. In this example, the optical flow generation module 206 is configured to estimate flow at a lower resolution (typically corresponding to a resolution, for which, a machine-learning model is trained) which is then upsampled before use to warp frames as further described below.

Conventional techniques used to compute optical flow are typically trained for use at a predetermined resolution (e.g., 1k or 2k), and thus can fail when confronted with higher resolution inputs, e.g., 4k video. Accordingly, the optical flow generation module 206 in this example is configured to compute optical flow for high-resolution digital images at a lower resolution and then use a neural network 302 to iteratively upsample the optical flow to correspond to a resolution of the inputs, i.e., the digital images 106. In an implementation, the upsampling is performed by a neural network that is guided by the input digital images, e.g., the first and second digital images in high (i.e., "original") resolution.

A downsampling module 304, for instance, is configured to generate downsampled digital images 306 from the input digital images 106. The downsampled digital images 306 have a resolution that approximates a resolution used to train the neural network 302. The downsampled digital images 306 are then processed by a flow estimation module 308 to estimate downsampled optical flows 310, e.g., from a first downsampled digital image to a second downsampled digital image, from the second downsampled digital image back to the first downsampled digital image, and so forth. An upsampling module 312 then employs the neural network 302 to generate the optical flows 208 by upsampling the downsampled optical flows 310 over a number of iterations.

Figure 11:
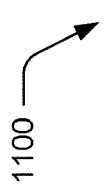
FIG. 11 depicts a table illustrating improvements in computing device operation realized through use of the spatting-based digital image synthesis techniques described herein.

Specifically, given a flow estimate at a resolution of "x" as well as two input digital images at a resolution of "2·x," the upsampling module 312 estimates flow at a resolution of "2·x" through a sequence of four convolutions and activations in between. To upsample a given flow estimate (i.e., downsampled optical flows 310) by a factor of four, the upsampling module 312 is executed twice. In practice, accuracy increases have been realized by guiding the upsampling using the input digital images 106 as well as the parameters of photometric consistency, optical flow consistency, and optical flow variance as further described in relation to FIG. 6 as these parameters also encode useful properties of the optical flow. In an implementation, operation of the upsampling module 312 is configured for simplified execution without using spatially-varying upsampling kernels, normalized convolution upsampling, or self-guided upsampling to increase performance and reduce computational cost. As illustrated by an example chart 1100 of FIG. 11 depicting real world scenarios, it has also been observed that estimation of optical flow at lower resolutions and subsequent upsampling is beneficial in terms of runtime and also quality.

The optical flows 208 are then provided by the optical flow generation module 206 as an input to an interpolation system 210 to generate warped digital images 212 and warp merge metrics 214. The warp merge metrics 214 describe "how good is that construction" for pixels in the warped digital images 212, and as such define relative importance of the pixels. Thus, the warp merge metrics 214 define weights as a weight map of respective pixels in the warped digital images 212, which are then used by a synthesis module 216 to generate the synthesized digital image 218 by combining the pixels based on these weights.

In this way, the digital image synthesis system 116 employs a splatting-based approach that is configured to resolve ambiguities where multiple pixels from an input digital image map to a same location, generate warped digital images 212 without introducing visual artifacts that involved machine-learning models to resolve using conventional techniques, and merge the warped digital images 212. Further discussion of generation of the warped digital images 212 and the warp merge metrics 214 are described in greater detail in the following discussion and shown in corresponding figures.

Figure 4:
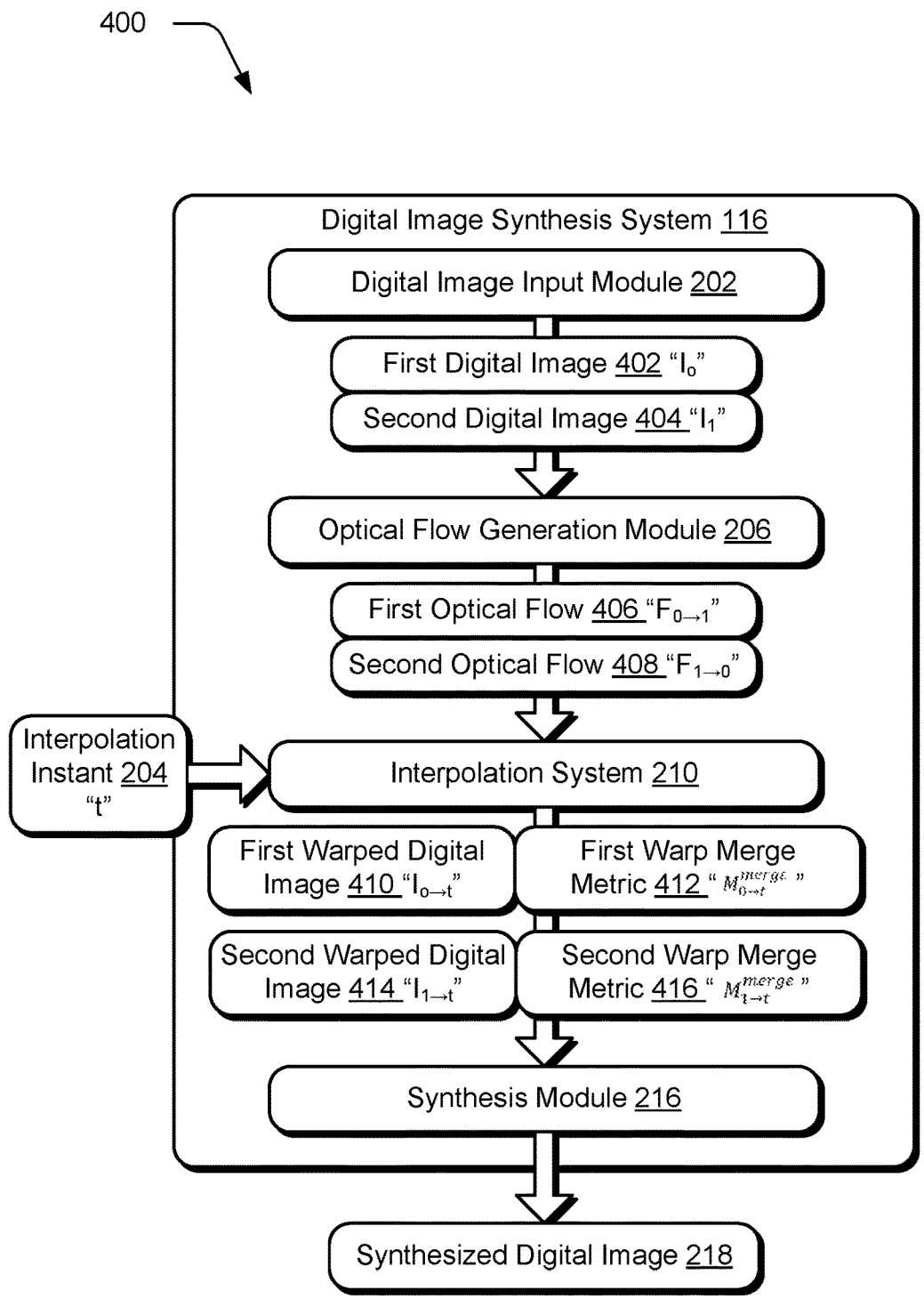
FIG. 4 depicts a system in an example implementation showing operation of an interpolation system of FIG. 2 in greater detail.

FIG. 4 depicts a system 400 in an example implementation showing operation of the digital image synthesis system 116 of FIG. 3 in greater detail as performing digital image synthesis for first and second digital images 402, 404. In the following discussion, the synthesized image 218 is synthesized as an intermediate digital frame disposed at a point in time relative to movement between first and second digital images 402, 404. Accordingly, the first digital image 402 is denoted as "$I_0$" and the second digital image 404 as "$I_1$." The optical flow generation module 206 generates the first optical flow 406 "$F_{0 \to 1}$" describing movement of pixels from "$I_0$" to "$I_1$." Likewise, the second optical flow 408 "$F_{1 \to 0}$" describes movement of pixels from "$I_1$" to "$I_0$."

The interpolation instant 204 (e.g., "t") is disposed relative to that flow. The interpolation system 210 is then tasked in this example to form a first warped digital image 410 "$I_{0 \to t}$" based on the first digital image 402 "$I_0$" and a first warp merge metric 412 "$M_{0 \to t}^{merge}$" that is configured as a weighted map describing relative importance of pixels in the first warped digital image 410. Similarity, the interpolation system 210 forms a second warped digital image 414 "$I_{1 \to t}$," based on the second digital image 404 "$I_1$" and a second warp merge metric 416 "$M_{0 \to t}^{merge}$" that is configured as a weighted map describing relative importance of pixels in the second warped digital image 414. As described above, the first and second warped digital images 410, 414 are then combined by the synthesis module 216 based on the first and second warp merge metrics 412, 416 (and more particularly weights defined for respective pixels from the maps) to form the synthesized digital image 218.

Figure 5:
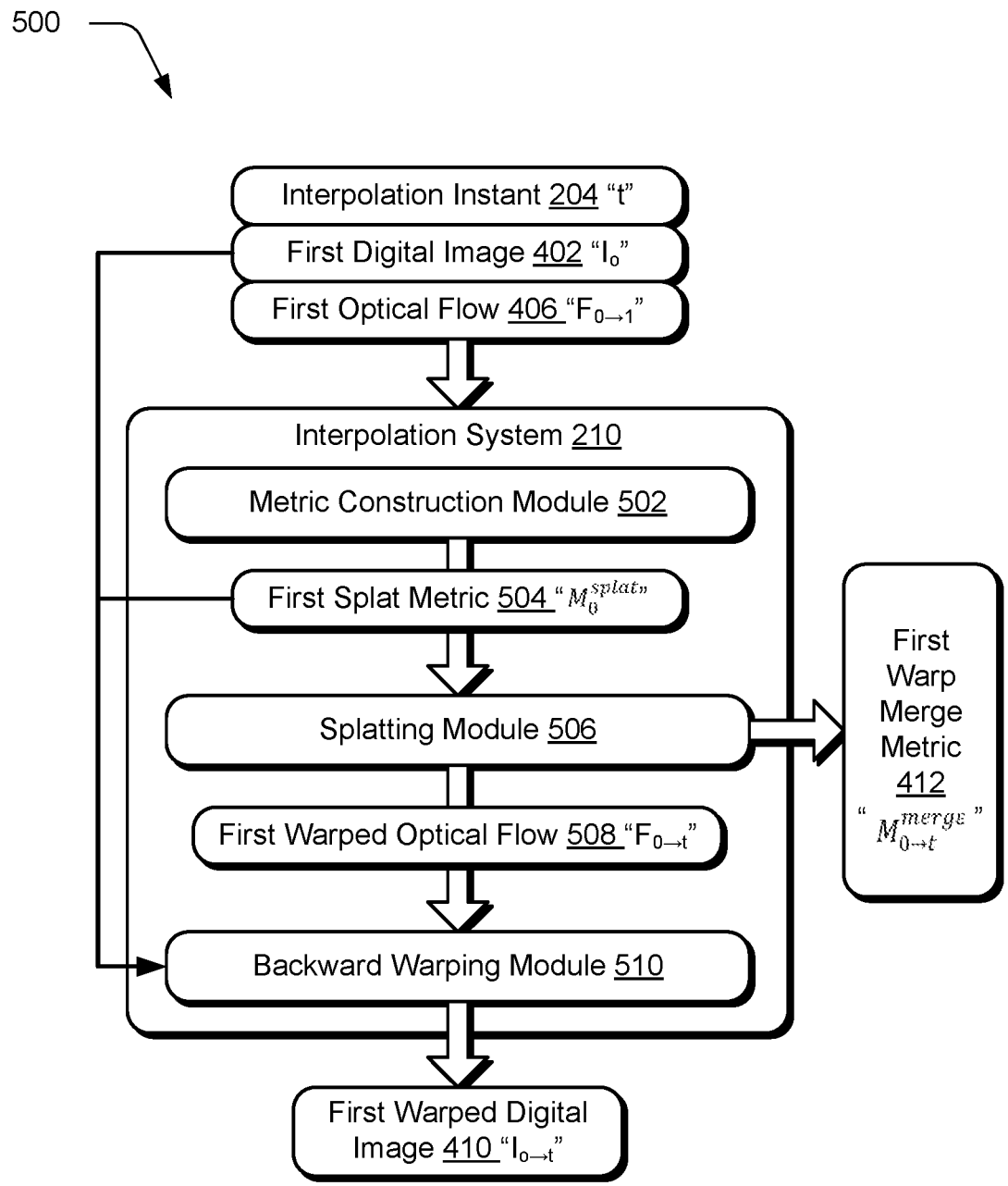
FIG. 5 depicts a system in an example implementation showing operation of the interpolation system of FIG. 4 in greater detail as generating a first warped digital image and a first warp merge metric.

FIG. 5 depicts a system 500 in an example implementation showing operation of the interpolation system 210 of FIG. 4 in greater detail as generating a first warped digital image 410 and first warp merge metric 412. The interpolation system 210 begins in this example by receiving the interpolation instant 204 "t", first digital image 402 "$I_0$," and first optical flow 406 "$F_{0 \to 1}$."

A metric construction module 502 is first employed by the interpolation system 210 to construct a first splat metric 504 "$M_0^{splat}$" (block 906). A splatting module 506 then receives the first digital image 402 "$I_0$" and the first splat metric 504 "$M_0^{splat}$" as an input. Based on these inputs, the splatting module 506 is configured to produce a first warped optical flow 508 "$F_{0 \to t}$" that describes optical flow at the interpolation instant 204 "t" using forward warping (block 908).

A splat metric is a two-dimensional image/matrix that weights each pixel in the input (e.g., the first digital image 402) and is also configurable as any other type of feature representation, e.g., for the merge metric as described below. The weight is used to resolve ambiguities when two or more pixels in the input map to the same target location in a forward warped/splatted output. The splat metric is configurable based on the inverse distance of a pixel to the camera such that a pixel closer to the camera has a higher weight than a pixel further away from the camera, e.g., to follow z-buffering in computer graphics. Thus, the splat metric is configured to aide resolution of self-intersections caused by movement, e.g., when multiple pixels map to a same location.

Likewise, the merge metric as further described below is a two-dimensional image/matrix that specifies weights each pixel in the input, e.g., a warped digital image, optical flow, etc. The weight is then used to combine multiple warped images/feature representations to a single output image/feature representation. The merge metric, for instance, is usable to describe reliability of an underlying optical flow vector as used to synthesize an output pixel, e.g., if the optical flow is unreliable then the result is unreliable too such as typically exhibited at motion boundaries. Thus, the merge metric supports techniques to pick/weight/combine pixels at each location when combining two or more partial results.

The merge metric, like the splat metric, is obtained at the interpolation instant "t" of the input. That is, for "$I_0$" the splat metric "$M^{splat}$" and the merge metric "$M^{merge}$" are obtained at "t=0." However, "$M^{merge}$" at "t=0.5" is used by a backward warping module to interpolate a frame at that time. As such, the interpolation system 210 is configured to splat the first digital image 402 "$I_0$" to "t=0.5" but also "$M^{merge}$" as generating a first warp merge metric 412 "$M_{0 \to t}^{merge}$." The first splat metric 504 "$M_{0 \to t}^{splat}$" is used to resolve ambiguities when pixels map to a same location.

Figure 6:
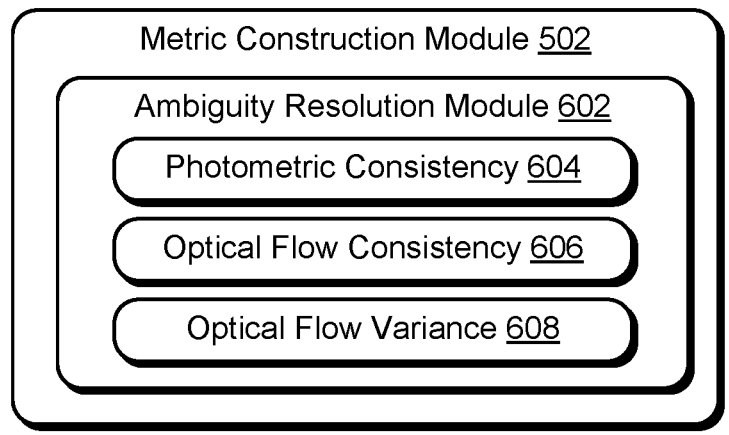
FIG. 6 depicts an example implementation showing operation of a metric construction module of FIG. 5 in greater detail as employing parameters usable to generate metrics to resolve ambiguities in image synthesis.

FIG. 6 depicts an example implementation 600 showing operation of a metric construction module 502 of FIG. 5 in greater detail as employing parameters (e.g., measures) usable to generate metrics to resolve ambiguities. In order to generate these metrics, the metric construction module 502 employs an ambiguity resolution module 602 that is configured to employ a variety of criteria usable to resolve ambiguities and/or define "importance" of respective pixels in an input, e.g., a digital image, optical flow, or other feature representation. Illustrated examples of these parameters include photometric consistency 604, optical flow consistency 606, and optical flow variance 608. Other examples are also contemplated, such as image depth.

Photometric consistency 604 is definable using backward warping "$\leftarrow \omega(\cdot)$" as:

$$\psi_{photo} = \|I_0 - \overleftarrow{\omega}(I_1, F_{0 \to 1})\|$$

In practice, photometric consistency accuracy is challenged when confronted by brightness changes, as is frequently the case with changes in shading. As such, optical flow consistency 606 may also be considered, which is defined as:

$$\psi_{flow} = \|F_{0 \to 1} + \overleftarrow{\omega}(F_{1 \to 0}, F_{0 \to 1})\|$$

Optical flow consistency 606 is based on consistency in mapping flow of a pixel from a target back to a source, which is invariant to brightness changes and particularly useful for determining the splat metric "$M^{splat}$".

Optical flow variance 608 indicates local changes in flow as:

$$\psi_{varia} = \|\sqrt{G(F_{0 \to 1}^2) - G(F_{0 \to 1})^2}\|$$

where "$G(\cdot)$" denotes a "3×3" Gaussian filter. Optical flow variance 608 is high in areas with discontinuous flow, as is the case at motion boundaries. Optical flow estimates tend to be inaccurate at boundaries, which makes this measure particularly useful for the merge metric "$M^{merge}$".

In an implementation, the ambiguity resolution module 602 combines these measures to define the splat metric "$M^{splat}$" and the merge metric "$M^{merge}$," respectively, as:

$$M^{splat} = \frac{1}{1 + \alpha_p^s \cdot \psi_{photo}} + \frac{1}{1 + \alpha_f^s \cdot \psi_{flow}} + \frac{1}{1 + \alpha_v^s \cdot \psi_{varia}}$$

where $$\langle \alpha_p^s, \alpha_f^s, \alpha_v^s \rangle$$

are tunable parameters. The merge metric "$M^{merge}$" is defined similarity as $$\langle \alpha_p^m, \alpha_f^m, \alpha_v^m \rangle$$

In an implementation, these six parameters are initially set to "1" and learned through end-to-end training as part of machine learning. Other techniques are also employable, including use of a neural network to merge the individual parameters. Thus, the splat metric "$M^{splat}$" and the merge metric "$M^{merge}$," are produced using photometric consistency 604, optical flow consistency 606, and optical flow variance 608 in this example, but are weighted differently and thus have separate alpha values as shown above.

As described above, the interpolation system 210 is based on splatting, also referred to as forward warping. The challenge with spatting is that in some instances multiple pixels from a source map to a same location in a target, which creates an ambiguity that in a context of deep learning is resolves differentiably. Once convention technique to resolve this is referred to as "softmax splatting," see further Simon Niklaus and Feng Liu. "Softmax Splatting for Video Frame Interpolation." In *IEEE Conference on Computer Vision and Pattern Recognition*, 2020. However, in has been determined herein that this technique as conventionally implemented includes a numerical instability which causes this technique to fail on conventional computing devices due to limitations in floating point calculations.

For example, given a first digital image "$I_0$," a first optical flow "$F_{0 \to 1}$" that maps pixels in first digital image "$I_0$" to the target time/location defined by interpolation instant "t" and a weight map "$Z_0$" to resolve ambiguities, softmax splatting is defined as:

$$\vec{\sigma}(I_0, F_{0 \to t}, Z_0) = \frac{\overrightarrow{\sum}(\exp(Z_0) \cdot I_{0,} F_{0 \to t})}{\overrightarrow{\sum}(\exp(Z_0), F_{0 \to t})}$$

where "$\overrightarrow{\Sigma}(\bullet)$" is summation splatting and "$Z_0$" is used to weight pixels in the first digital image "$I_0$" to resolve cases where multiple pixels map to the same target location. The weight map "$Z_0$" in this example supports an importance metric, e.g., as a soft inverse z-buffer.

In real world scenarios, the softmax operator is not implementable as defined above since it is numerically unstable, e.g., "exp(X)" quickly exceeds a 32-bit floating point when "X>50." Since "softmax(X+c)=softmax(X)" for any "c," "softmax(X')" is usable in stances instead where "X'=X−max(X)." However, this is not directly usable for softmax splatting. For example, consider a weight map "$Z_0$" with a first element set to "1000" and each other element set to "∈[0, 1]." Shifting the weights by "−1000" effectively sets each weight but one to a value of "1" and reduces the overall operation to average splatting, thus ignoring "$Z_0$" altogether.

Figure 7:
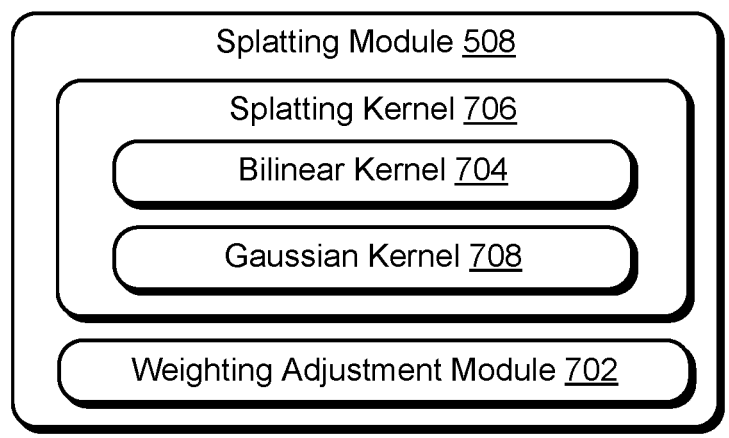
FIG. 7 depicts an example implementation showing operation of the spatting module of FIG. 5 in greater detail as employing a Gaussian kernel and a weighting adjustment module.

To address this, the splatting module 506 employs a weighting adjustment module 702 as shown in an example implementation 700 of FIG. 7 that looks at a maximum weight at each location, instead of an entire image, and subtracts that before taking the exponent. As a result, the weights are adaptively shifted at the destination location where multiple source pixels overlap. To do so, the weight map "$Z_0$" is first warped to interpolation instant "t" to form "$Z_0$" which denotes a maximum weight for each pixel in the destination location. This is computable in parallel using an atomic max. This step can be implemented without being differentiable as it is used to make softmax splatting numerically stable. A value of "$Z_{0 \to t}^{max}[p]$" is subtracted from "$Z_0[q]$" before applying the exponential function when warping from a point "q" to a point "p," analogous to what is typically performed when implementing softmax.

Thus, numerically stable softmax splatting as implemented by the splatting module 506 is definable as:

$$\text{let } u = p - (q + F_{0 \to t}[q])$$

$$I_t[p] = \frac{\Sigma_{\forall q \in I_0} b(u) \cdot \exp(Z_0[q] - Z_{0 \to t}^{max}[p]) \cdot I_0[q]}{\Sigma_{\forall q \in I_0} b(u) \cdot \exp(Z_0[q] - Z_{0 \to t}^{max}[p])}$$

$$b(u) = \max(0, 1 - |u_x|) \cdot \max(0, 1 - |u_y|).$$

where "$b(\bullet)$" is a bilinear kernel 704, which is an example of a splatting kernel 706 used by the splatting module 506. This technique has been found in practice to result in consistent improvement in interpolation quality and hence underlying operation of computing devices that implement these techniques.

Thus, the first step in the splatting-based synthesis technique implemented by the interpolation system 210 for video frame interpolation is to warp the first digital image 402 "$I_0$" and the second digital image 40 "$I_1$" to a desired interpolation instant "t" using the first optical flow 406 "$F_{0 \to 1}$" and the second optical flow 408 "$F_{1 \to 0}$", respectively. However, directly spatting the input digital images directly results in visual artifacts caused when multiple pixels map to the same target location. To address this ambiguity, the interpolation system 210 employs an auxiliary weight "$M^{splat}$" that serves as a soft inverse z-buffer as described above.

In practice, naive application of softmax splatting leads to visual artifacts and introduces blurriness. To address this, the interpolation system 210 employs warping-based interpolation approaches to splat the optical flows (e.g., the first optical flow 406 "$F_{0 \to 1}$" to "t" to obtain the first warped optical flow 508 "$F_{0 \to t}$"), which is then used to backward warp the first digital image 402 "$I_0$" by a backward warping module 510 to obtain the first warped digital image 410 "$I_{0 \to t}$." (block 910). A first warp merge metric is also constructed (block 912) describing accuracy of respective pixels in the first warped digital image 410.

In some instances, splatting leads to visual artifacts that appear as "holes" in a warped result, e.g., due to occlusions, divergent flow fields, and so forth. To address this, the splatting module 506 is configurable to employ a Gaussian kernel 708. In this instance, a default bilinear kernel 704 having a footprint of "2×2" is replaced with a "4×4" Gaussian kernel 708. Although such a wider kernel would lead to blurrier results when splatting colors, gaussian kernel 708 does not affect clarity in the techniques described herein in which the splatting module 506 is employed to splat (i.e., forward warp) optical flows to generate the first warped optical flow 508, which is then backward warped by the backward warping module 510 to generate the first warped digital image 410.

Accordingly, the interpolation system 210 is configured to warp the first digital image 402 "$I^0$" to generate the first warped digital image 410 "$I_{0 \to t}$" and the second digital image 404 "$I^1$" to generate the second warped digital image 414 "$I_{1 \to t}$." Rather than averaging these results by the backward warping module 510 (which can cause visual artifacts), the first warp merge metric 412 "$M_{0 \to t}^{merge}$" and the second warp merge metric 416 "$M_{1 \to t}^{merge}$" are used as instances of an auxiliary map "$M^{merge}$" that specifies weights to the individual results before merging them by the synthesis module 216 to obtain the synthesized digital image 218 "$I_t$" at interpolation instant "t" as:

$$I_t = \frac{(1-t) \cdot M_{0 \to t}^{splat} \cdot I_{0 \to t} + t \cdot M_{1 \to t}^{splat} \cdot I_{1 \to t}}{(1-t) \cdot M_{0 \to t}^{splat} + t \cdot M_{1 \to t}^{splat}}$$

where the first warped digital image 410 "$I_{0 \to t}$" is the first digital image 402 "$I_0$" warped to time "t," "$M_{0 \to t}^{splat}$", is "$M^{splat}$" warped to time "t," and analogous for the second warped digital image 414 "$I_{0 \to t}$" in the opposite direction.

Figure 8:
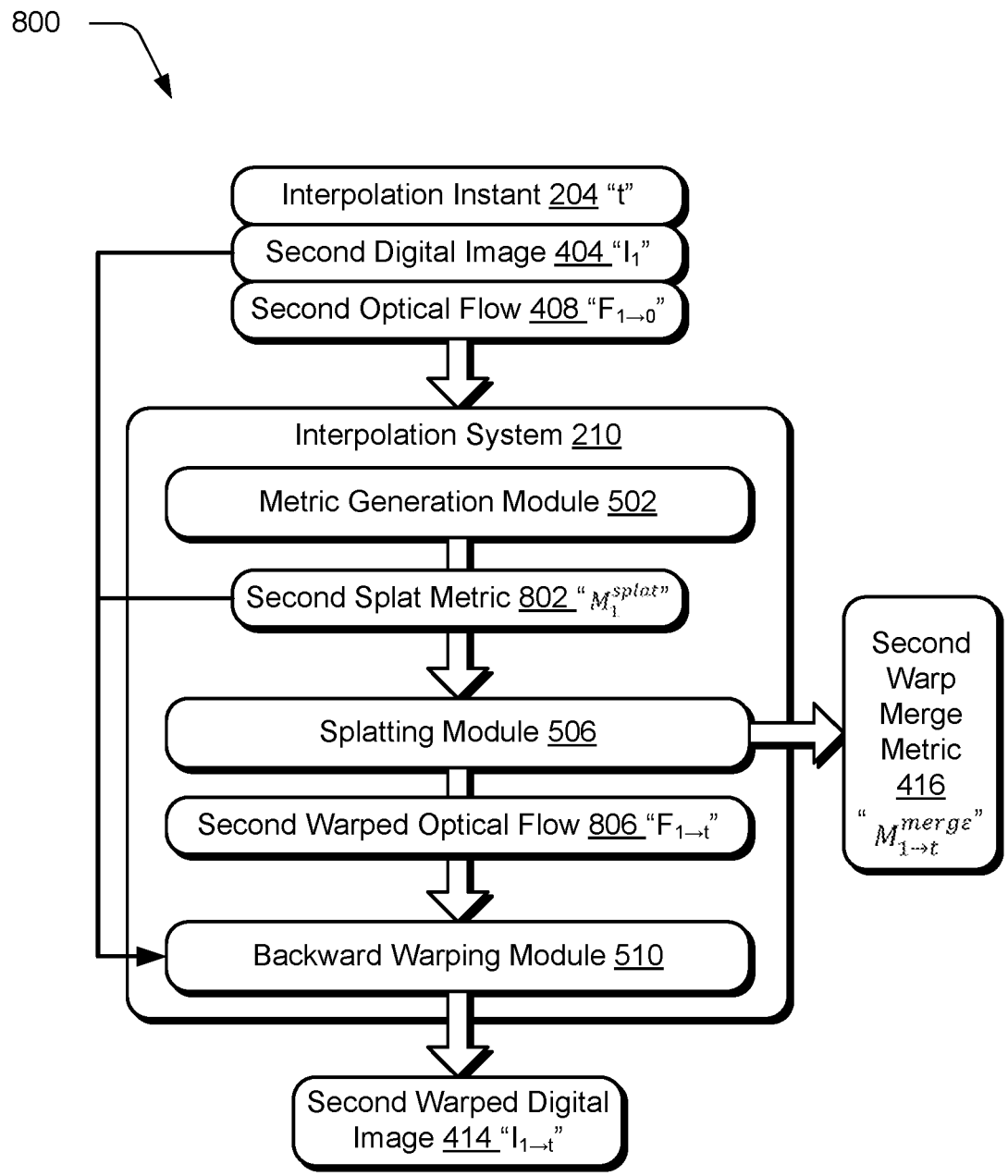
FIG. 8 depicts an example implementation of operation of the interpolation system of FIG. 5 to form a second warped digital image and a second warp merge metric.
Figure 9:
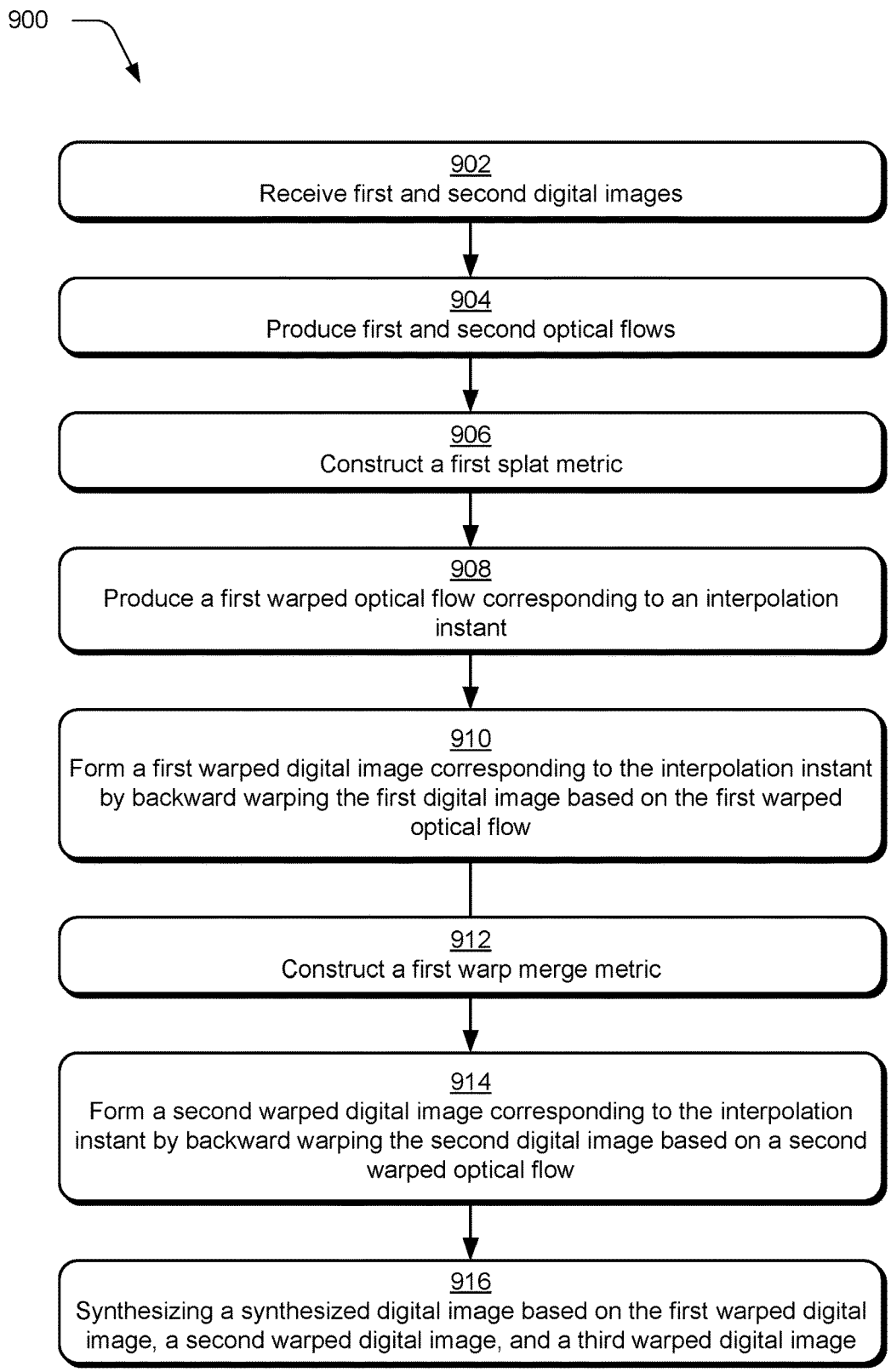
FIG. 9 is a flow diagram depicting a procedure in an example implementation of automated splatting-based digital image synthesis.

FIG. 8 depicts an example implementation 800 of operation of the interpolation system 210 to form the second warped digital image 414 and second warp merge metric 416. The interpolation system 210 begins in this example by receiving the interpolation instant 204 "t", second digital image 404 "$I_1$," and second optical flow 408 "$F_{1 \to 0}$."

The metric construction module 502 is again employed by the interpolation system 210, which in this instance is used to generate a second splat metric 802 "$M_1^{splat}$." The splatting module 506 then receives the second digital image 404 "$I_1$," the second splat metric 802 "$M_1^{splat}$" and the second merge metric 804 "$M_1^{merge}$" as an input. Based on these inputs, the splatting module 506 is configured to generate a second warped optical flow 806 "$F_{1 \to t}$," that describes optical flow at the interpolation instant 204 "t" using forward warping. A second warp merge metric 416 is also generated by the splatting module 506 using forward warping as previously described. The backward warping module 510 is again employed, in this instance to form a second warped digital image 414 "$I_{1 \to t}$," (block 914), which is also usable to generate a corresponding second warped merge metric. The synthesis module is then utilized to synthesize a synthesized digital image based on the first warped digital image and the second warped digital image using the first and second warp merge metrics. Although this process has been described for first and second digital images 402, 404, this process is repeatable for third digital images by generating a third warped digital image and a third warp merge metric (block 916), a fourth digital image, and so on that are subsequently combinable by the synthesis module 216 to improve accuracy.

The warp merge metrics define relative importance of pixels of the warped digital image, which is based on a calculated degree of accuracy and/or confidence in the pixels. This is used to suppress influence of unreliable pixels when generating the synthesized digital image, e.g., to address movement at borders of an object. In this way, the splatting and backward warping techniques support accuracy in generation of the warped digital images and a subsequent synthesized digital image. This is performable without use of conventional refinement techniques typically implemented using neural networks.

Example System and Device

Figure 12:
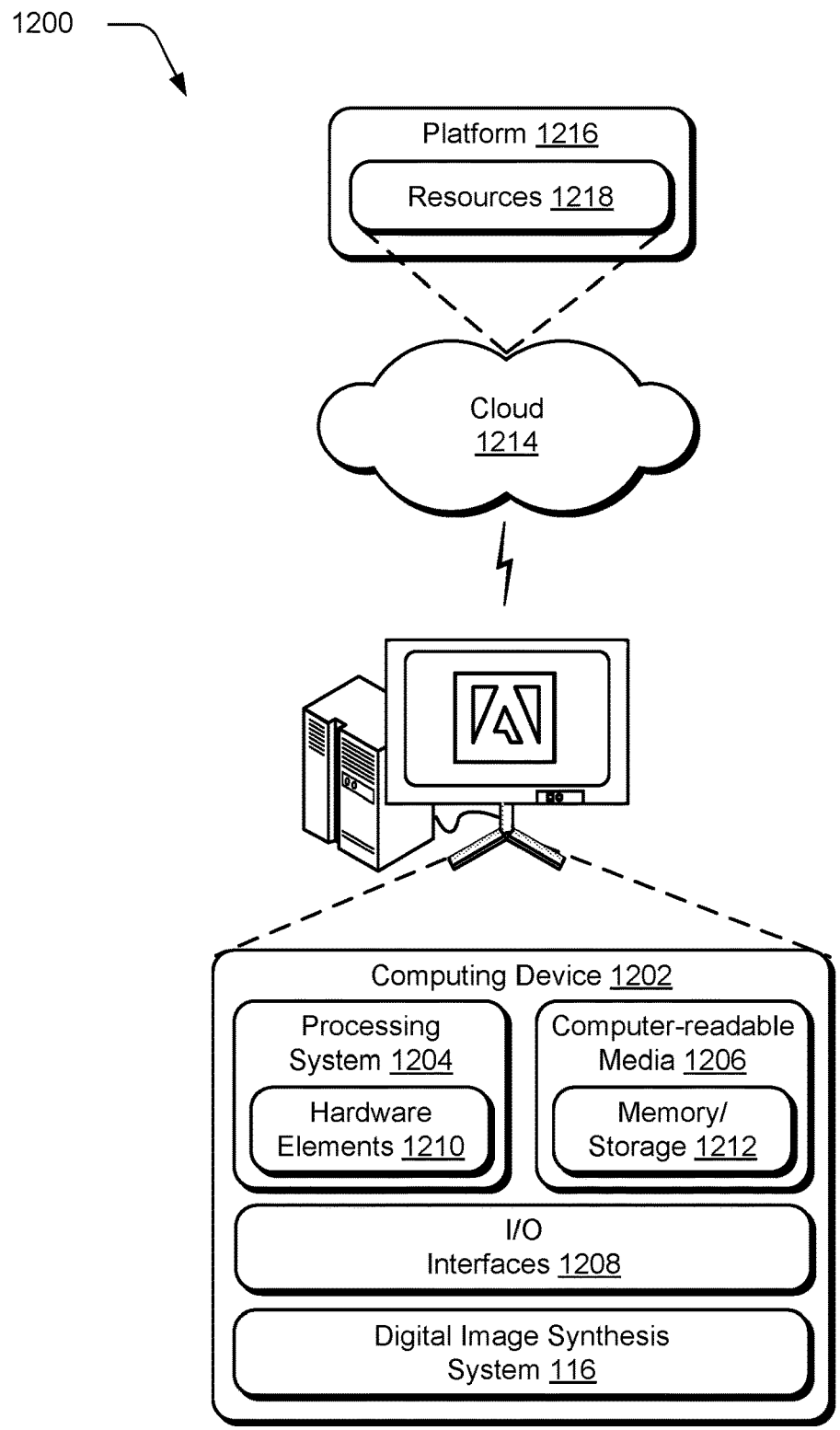
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the digital image synthesis system 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium digital image synthesis environment, a method implemented by a computing device, the method comprising:
   receiving, by the computing device, a first digital image and a first optical flow describing pixel movement of the first digital image to a second digital image;
   constructing, by the computing device, a first splat metric defining a weighted map of respective pixels of the first digital image based on a parameter;
   producing, by the computing device, a first warped optical flow corresponding to an interpolation instant by forward warping the first optical flow based on the first splat metric;
   forming, by the computing device, a first warped digital image corresponding to the interpolation instant by backward warping the first digital image based on the first warped optical flow; and
   constructing, by the computing device, a first merge metric defining a weighted map of respective pixels of the first warped digital image.

2. The method as described in claim 1 wherein the first merge metric defines relative importance of the pixels of the first warped digital image based on the parameter.

3. The method as described in claim 1 wherein the first splat metric defines relative importance of the pixels of the first digital image based on the parameter and is configured to resolve ambiguities caused when multiple pixels in the first digital image map to a same location.

4. The method as described in claim 1, wherein the parameter includes photometric consistency, optical flow consistency, or optical flow variance.

5. The method as described in claim 1, wherein the producing the first warped optical flow employs a Gaussian kernel.

6. The method as described in claim 1, wherein the producing the first warped optical flow employs a weight shifting technique in which a maximum pixel value for a plurality of said pixels mapped to a same location is removed from pixel values of the plurality of said pixels.

7. The method as described in claim 1, further comprising synthesizing a synthesized digital image based on the first warped digital image, the first warp merge metric, a second warped digital image, and a second warp merge metric, the second warped digital image and the second warp merge metric formed based on the second digital image for the interpolation instant.

8. The method as described in claim 7, wherein the synthesizing includes synthesizing the synthesized digital image based on a third warped digital image and a third warp merge metric formed based on a third digital image for the interpolation instant.

9. The method as described in claim 1, further comprising generating the first optical flow by:
   downsampling the first digital image and the second digital image;
   estimating a downsampled first optical flow based on the downsampled first digital image and the second digital image; and
   upsampling the downsampled first optical flow to generate the first optical flow iteratively using a neural network.

10. The method as described in claim 9, wherein the upsampling is guided by the first digital image and the second digital image.

11. In a digital medium digital image synthesis environment, a system comprising:
   a digital image input module implemented by a processing system to receive a plurality of digital images and an input specifying an interpolation instant;
   an optical flow generation module implemented by the processing system to generate a plurality of optical flows describing pixel movement between the plurality of digital images;
   an interpolation system implemented by the processing system to generate a plurality of warped digital images and a plurality of warp merge metrics based on the plurality of digital images and the plurality of optical flows, the plurality of warp merge metrics defining individual pixel accuracy in the plurality of warped digital images, respectively; and
   a synthesis module implemented by the processing system to generate a synthesized digital image by combining the plurality of warped digital images based on the plurality of warp merge metrics.

12. The system as described in claim 11, wherein the plurality of digital images includes at least three said digital images and the plurality of warped digital images includes at least three said warped digital images.

13. The system as described in claim 11, wherein the interpolation system employs a Gaussian kernel as part of producing a plurality of warped optical flows using forward warping.

14. The system as described in claim 13, wherein the interpolation system generates the plurality of warped digital images by backward warping the plurality of digital images using the plurality of warped optical flows, respectively.

15. The system as described in claim 11, wherein the interpolation system employs a weight shifting technique, as part of producing a plurality of warped optical flows, in which a maximum pixel value for a plurality of said pixels mapped to a same location is removed.

16. The system as described in claim 11, wherein the interpolation system employs a plurality of splat metrics or a plurality of merge metrics, the plurality of splat metrics and the plurality of merge metrics constructed using a parameter that includes photometric consistency, optical flow consistency, and optical flow variance.

17. In a digital medium digital image synthesis environment, a system comprising:
   means for generating a plurality of warped digital images and a plurality of warp merge metrics, the generating means including:
      means for generating a plurality of warped optical flows for an interpolation instant by forward warping a plurality of optical flows to an interpolation instant;
      means for generating the plurality of warped digital images by backward warping a plurality of digital images using the plurality of warped optical flows; and
      means for generating a plurality of warp merge metrics having weight maps describing respective accuracy of pixels of the plurality of warped digital images; and
   means for generating a synthesized digital image by combining the plurality of warped digital images based on the plurality of warp merge metrics.

18. The system as described in claim 17, wherein the means for generating the plurality of warp optical flows employs a Gaussian kernel.

19. The system as described in claim 17, wherein the means for generating the plurality of warped digital images employs a weight shifting technique in which a maximum pixel value for a plurality of said pixels mapped to a same location is removed.

20. The system as described in claim 17, wherein the plurality of warp merge metrics are based on photometric consistency, optical flow consistency, or optical flow variance.

* * * * *